(12) United States Patent
Miyamoto et al.

(10) Patent No.: US 6,492,435 B1
(45) Date of Patent: Dec. 10, 2002

(54) WATER BASED WHITE COLOR TONE PIGMENT INK FOR BALL POINT PEN

(75) Inventors: Masaru Miyamoto, Yokohama (JP); Miki Shinozuka, Hiroshima (JP); Tadashi Kamagata, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/423,149

(22) PCT Filed: May 6, 1999

(86) PCT No.: PCT/JP98/02006

§ 371 (c)(1),
(2), (4) Date: Oct. 29, 1999

(87) PCT Pub. No.: WO98/50473

PCT Pub. Date: Nov. 12, 1998

(30) Foreign Application Priority Data

May 7, 1997 (JP) ............................................. 9-116619

(51) Int. Cl.$^7$ .......................... C09D 11/18; C08K 3/22; C08L 25/04; C08L 33/02; C08L 33/04
(52) U.S. Cl. ........................................ 523/161; 524/497
(58) Field of Search ................. 523/160, 161; 106/31.6; 524/497, 847

(56) References Cited

U.S. PATENT DOCUMENTS

| | | | | |
|---|---|---|---|---|
| 4,664,711 A | * | 5/1987 | Kawaguchi et al. | 524/399 |
| 4,833,117 A | * | 5/1989 | Brooks et al. | 503/201 |
| 4,942,185 A | * | 7/1990 | Inoue et al. | 521/54 |
| 5,466,281 A | * | 11/1995 | Hanke et al. | 106/31.38 |
| 5,547,499 A | * | 8/1996 | Kawasumi et al. | 106/31.25 |
| 5,580,374 A | * | 12/1996 | Okumura et al. | 524/84 |
| 5,712,328 A | * | 1/1998 | Inoue et al. | 523/161 |
| 5,879,439 A | * | 3/1999 | Nagai et al. | 106/31.28 |
| 5,990,201 A | * | 11/1999 | Miyazaki et al. | 523/161 |
| 6,025,413 A | * | 2/2000 | Xu et al. | 523/161 |

FOREIGN PATENT DOCUMENTS

| | | |
|---|---|---|
| JP | Sho 63-145380 | 6/1988 |
| JP | Hei 4-258677 | 9/1992 |
| JP | Hei 6-287499 | 11/1994 |
| JP | Hei 7-62281 | 3/1995 |
| JP | Hei 7-216283 | 8/1995 |
| JP | Hei 8-12916 | 1/1996 |
| JP | Hei 8-231916 | 9/1996 |
| JP | Hei 8-325503 | 12/1996 |

OTHER PUBLICATIONS

Patton, Temple C.; Pigment Handbook vol. II, John Wiley and Sons, New York (pp. 172–173), 1973.*

* cited by examiner

Primary Examiner—Vasu Jagannathan
Assistant Examiner—Callie E Shosho
(74) Attorney, Agent, or Firm—Darby & Darby

(57) ABSTRACT

A water based white color tone pigment ink for a ballpoint pen comprising titanium oxide having an oil absorption of 25 (g/100 g) or less and an average particle diameter of 400 nm or less, a water soluble resin, a thickener, water and a polar solvent, which can provide drawn lines to be excellent in developing colors such as a white color and a poster color regardless of a color tone of writing paper and which can cover or correct drawn lines printed by means of a writing instrument, a type writer and a copying machine.

4 Claims, No Drawings

WATER BASED WHITE COLOR TONE PIGMENT INK FOR BALL POINT PEN

TECHNICAL FIELD

The present invention relates to a water based white color tone pigment ink for a ballpoint pen which can provide drawn lines to be excellent in developing colors such as a white color and a poster color regardless of a color tone of writing paper and which can cover or correct drawn lines printed by means of a writing instrument, a type writer and a copying machine, more specifically to a water based white pigment ink for a ballpoint pen which inhibits titanium oxide from settling even in storing over a long period of time and which has a good follow-up property and makes it possible to write continuously.

BACKGROUND ART

An ink using a compound of silicic acid and aluminum as a dispersant has so far been known as a water based ink using as a colorant titanium oxide, which is a white pigment. Further, described in Japanese Patent Laid-Open No. Hei 7-62281 is a water based white pigment composition containing at least titanium oxide having an oil absorption of 30 or more and an isoelectric point of pH 7 or less, a water soluble (meth)acryl base resin and water, which is used for a correction fluid and an ink for a writing instrument.

However, since these inks do not inhibit titanium oxide from settling, they have to be stirred again before use and have had the inconvenience that a ball for stirring has to be put in a tank for storing ink.

In contrast with the inks described above, as a water based white color pigment ink for a ballpoint pen in which titanium oxide does not settle, an ink containing a white pigment, tabular silicate, a water soluble resin, a water soluble organic solvent and water and having a viscosity of 6000 to 100,000 mPa·s is described in, for example, Japanese Patent Laid-Open No. Hei 6-287499. However, this ink has the problem that it has a high viscosity and is inferior in a follow-up property in writing.

Further, described in Japanese Patent Laid-Open No. Hei 7-216283 is an ink containing a white pigment, a nonionic surfactant having an HLB of 17.0 or more, a water soluble resin and water and having a viscosity of 6,000 to 50,000 mPa·s. However, this ink also does not solve the problem that the follow-up property in writing is not good because of the high viscosity.

Further, described in Japanese Patent Laid-Open No. Hei 8-12916 is an ink containing titanium oxide, a thickening water-soluble resin, a binder, sugar alcohol and water and having a viscosity of 6,000 to 50,000 mPa·s and a viscosity index of 2 or more which is obtained from a revolution difference of a viscometer. However, even if this viscosity index is met, the inferior follow-up property of the ink in writing quickly and splitting of the drawn lines are not solved. In addition thereto, since only a white pigment is added as a coloring material, the ink has the problem that the marking performance is inferior on writing paper having a white ground.

On the other hand, described in Japanese Patent Laid-Open No. Hei 4-258677 is a water based ink for a marking pen or for correction which contains hollow particles having two or more pores in the inside thereof in place of titanium oxide in order to avoid coagulating and settling of titanium oxide and can display a covering effect.

However, the hollow particles used in this water based ink have a covering effect but have the problem that the covering effect is still lower than that of titanium oxide and that when the adding amount of the hollow particles is increased, inferior dispersion thereof is caused.

In light of the conventional technical problems described above, an object of the present invention is to solve them and to provide a water based white color tone pigment ink for a ballpoint pen which is improved in water resistance and weatherability of drawn lines by enhancing dispersibility of titanium oxide that is an excellent white covering agent and can provide vivid drawn lines having a good poster color tone even on writing paper having a dark color, which is inhibited from deterioration such as coagulation and settling/separation of titanium oxide particles even in storing over a long period of time and which has a good follow-up property and makes it possible to write continuously.

DISCLOSURE OF THE INVENTION

Intensive investigations repeated by the present inventors regarding the conventional technical problems described above have resulted in successfully obtaining a water based white color tone pigment ink for a ballpoint pen which meets the object described above by adding titanium oxide having specific physical properties and specific ink components, and thus coming to complete the present invention.

That is, the water based white color tone pigment ink for a ballpoint pen according to the present invention comprises the following items (1) to (4):

(1) A water based white color tone pigment ink for a ballpoint pen comprising titanium oxide having an oil absorption of 25 (g/100 g) or less and an average particle diameter of 400 nm or less, a water soluble resin, a thickener, water and a polar solvent.

(2) The water based white color tone pigment ink for a ballpoint pen as described in the above item (1), containing at least one complementary colorant selected from a pigment, a resin emulsion, a hollow resin emulsion and a pseudo pigment obtained by dyeing these resin emulsions.

(3) The water based white color tone pigment ink for a ballpoint pen as described in the above item (1) or (2), wherein the ink has a viscosity of 500 to 5000 mPa·s.

(4) The water based white color tone pigment ink for a ballpoint pen as described in any of the above items (1) to (3), wherein the water soluble resin comprises a polymer and/or a copolymer of at least one monomer selected from acrylic acid, methacrylic acid, maleic acid, styrene, acrylic ester and methacrylic ester.

BEST MODE FOR CARRYING OUT THE INVENTION

The embodiment of the present invention shall be explained below in detail.

The water based white color tone pigment ink for a ballpoint pen according to the present invention is characterized by comprising titanium oxide having an oil absorption of 25 (g/100 g) or less and an average particle diameter of 400 nm or less, a water soluble resin, a thickener, water and a polar solvent.

Titanium oxide used in the present invention is used as a white pigment for providing the drawn lines with a covering property.

Uniformly and finely dispersed particles of titanium oxide make it possible to improve a covering property, a white color property, water resistance and light fastness of the drawn lines and an aging stability of the ink itself. The dispersibility of titanium oxide particles is affected largely by a treating condition of the surface of the particles, and inorganic adsorbing treatment with silica or alumina and organic coating treatment are usually carried out for easier treatment for enhancing the dispersibility.

The condition of the particle surface made by this treatment exerts a large influence on the oil absorption. For example, when a silica or alumina-adsorbed coating layer grows large to form a porous layer, the large oil absorption value is exhibited. When the oil absorption value is large, the particles coagulate each other due to adsorption and degradation of the dispersibility caused by releasing the coating layer are brought about. Accordingly, such treatment is not suitable for maintaining the dispersibility over a long period of time.

If titanium oxide particles are finely crushed to primary particles and the primary particles have a small particle diameter, they are less liable to settle down. However, if the particles themselves are smaller than the wavelength of visible rays, the covering power is reduced, and the capacity as a white pigment is lowered.

In the present invention, in relation to the preceding dispersibility and covering power of titanium oxide, the surface condition of the particles and the particle diameter have been investigated in further details, and as a result, it has been confirmed that use of titanium oxide having such physical properties as an oil absorption of 25 (g/100 g) or less and an average particle diameter of 400 nm or less solves the preceding problems of the dispersibility and the covering power and provides the intended ink.

That is, in titanium oxide having such a physical property as an oil absorption of 25 (g/100 g) or less, the adsorbed coating layer is stabilized, and the particles is prevented from coagulating each other due to adsorption. In addition thereto, degradation of the dispersibility caused by releasing the coating layer is not brought about, and the dispersibility over a long period of time becomes good. Further, use of a water soluble resin as a dispersant, which shall be described later, makes it possible to enhance the dispersibility to a large extent.

Further, titanium oxide having an average particle diameter of 400 nm or less has a covering power as a white pigment and has an effect of inhibiting settling. It has preferably a particle diameter of minimum 100 nm or more in order to obtain the covering power.

Titanium oxide satisfying such physical properties include, for example, Tipure R-706 (oil absorption: 13, particle diameter: 260 nm), Tipure R-700 (oil absorption: 13, particle diameter: 270 nm) and Tipure R-902 (oil absorption: 16, particle diameter: 320 nm) each manufactured by Du Pont & Co.; KR-270 (oil absorption: 21, particle diameter: 300 nm) and KA-30 (oil absorption: 23, particle diameter: 300 nm) each manufactured by Titan Ind. Co., Ltd.; JR-300 (oil absorption: 18, particle diameter: 290 nm), JR-603 (oil absorption: 21, particle diameter: 280 nm) and JR-809 (oil absorption: 22, particle diameter: 230 nm) each manufactured by Tayca Corporation; A-100 (oil absorption: 22, particle diameter: 150 nm), R-580 (oil absorption: 19, particle diameter: 280 nm), R-830 (oil absorption: 21, particle diameter: 250 nm), CR-50 (oil absorption: 18, particle diameter: 250 nm) and CR-97 (oil absorption: 19, particle diameter: 250 nm) each manufactured by Ishiwara Sangyo Kaisha, Ltd.; TA-100 (oil absorption: 22, particle diameter: 300 nm), TR-600 (oil absorption: 19, particle diameter: 300 nm) and TR-900 (oil absorption: 18, particle diameter: 300 nm) each manufactured by Fuji Titan Co., Ltd.; R-310 (oil absorption: 21, particle diameter: 200 nm) and R-61N (oil absorption: 22, particle diameter: 260 nm) each manufactured by Sakai Chemical Industry Co., Ltd.; and FR-22 (oil absorption: 24, particle diameter: 250 nm) and FR-88 (oil absorption: 24, particle diameter: 190 nm) each manufactured by Furukawa Kikai Kinzoku Co., Ltd.

They can be used alone or a mixture of two or more kinds.

The using amount of titanium oxide shall not specifically be restricted and is preferably 10 to 50% by weight, more preferably 15 to 30% by weight base on the total amount of the ink composition.

The [oil absorption] prescribed in the present invention is a value obtained by converting the added amount of linseed oil relative to 100 g of titanium oxide, wherein 2 g of titanium oxide is weighed on a glass plate and linseed oil is dropwise added thereto little by little, followed by being uniformly mixed by means of a metal spatula, and the amount of linseed oil added until the mixture of linseed oil and titanium oxide becomes a lump to be molded is determined.

The [average particle diameter] is a value determined by a method in which the actual particles are observed under an electron microscope and the measured diameters are converted or by a method in which titanium oxide particles suspended in water are measured by means of a particle size distribution analyser according to a photon correlation method.

The water soluble resin used in the present invention is used as a dispersion-stabilizing agent for titanium oxide.

Titanium oxide having a small oil absorption is liable to adsorb a hydrophilic water soluble resin, and the titanium oxide particles adsorbing it are further improved in prevention of settling and coagulation in an ink system provided with a viscosity by a thickener.

In the present invention, acryl base resins out of the water soluble resins used are preferred, and among them, preferred is the water soluble resin comprising at a polymer and/or a copolymer of at least one monomer selected from acrylic acid, methacrylic acid, maleic acid, styrene, acrylic ester and methacrylic ester.

Specific examples of such resins include Joncryl J61J (aqueous ammonia solution of styrene-acrylic ester-acrylic acid copolymer), Joncryl J62 (aqueous ammonia solution of styrene-acrylic ester-acrylic acid copolymer), SMA-1440H (aqueous ammonia solution of styrene-maleic acid copolymer) and Julimer AT-210 (methacrylic esters copolymer). At least one resin selected from them can be used.

The using amount of the water soluble resin for dispersion is preferably 60% by weight or less, more preferably 0.1 to 20% by weight based on the weight of titanium oxide added.

The thickener used in the present invention is used for inhibiting titanium oxide from settling and providing an ink for a ballpoint pen with suitable fluidity, and the thickener has to be selected from ones having a property that they are not reduced in the effect when used in combination with titanium oxide and a complementary color pigment such as a resin emulsion, which shall be described later, in a water based ink.

To be specific, they include seed polysaccharides such as guar gum, locust bean gum, galactomannan, pectin and derivatives thereof, psyllium seed gum and tamarind gum; microbial gums such as xanthan gum, rheozan gum, rhamsan gum, welan gum and gellan gum; sea weed polysaccharides such as carrageenan, alginic acid and derivatives thereof; resin polysaccharides such as tragacanth gum; cellulose and derivatives thereof, all of which are a natural polysaccharide, and synthetic polymers such as polyacrylic acid and cross-linking type copolymers thereof, polyvinyl alcohol, polyvinylpyrrolidone and derivatives thereof, polyvinyl methyl ether and derivatives thereof.

The microbial gums are characterized by a strong viscosity-providing effect and physical properties which are stable even after storing over a long period of time but tend strongly to have properties of propagating miscellaneous germs and coagulating fine powder pigments. Polyacrylic acid and cross-linking type copolymers thereof are characterized by stability against coagulation of fine powder pigments and propagation of miscellaneous germs but tend to be inferior in a viscosity-providing property to natural polysaccharides.

Accordingly, at least one thickener selected from the thickeners described above can be used depending on the adding amounts and the kinds of titanium oxide and a complementary color pigment contained in the ink components, which shall be described later.

The adding amount of the thickener is preferably 0.1 to 1.5% by weight based on the total amount of the ink composition. The adding amount is varied depending on the kind of the thickener. It is preferably 0.1 to 0.8% by weight in the case of natural polysaccharides and preferably 0.1 to 1.5% by weight in the case of synthetic polymers.

The amount of the thickener of less than 0.1% by weight is liable to cause settling of the titanium oxide particles, and the amount exceeding 1.5% by weight reduces the fluidity of the ink and therefore tends to be liable to cause inferior writing due to the inferior follow-up property of the ink.

The fluidity can be judged by the viscosity of the ink. For example, judging from a value determined by means of an E type viscometer (25° C.), which is a conventional rotational viscometer, the viscosity at 1 rpm has to be 500 mPa·s or more for inhibiting the titanium oxide particles from settling. In order to provide the viscosity falling in this range of viscosity, the foregoing amount of the thickener has to be added. Further, if the viscosity exceeds 5,000 mPa·s, the fluidity of the ink is reduced, and the follow-up property of the ink and the feeding of the ink from the pen tip of the ballpoint pen to writing paper are deteriorated. Accordingly, the adding amount of the thickener has to be controlled.

The complementary color pigment used in the present invention is used for further strengthening a white color which is a ground color of a titanium oxide particle and/or toning and preparing a color other than a white color. A pigment itself is excellent in water resistance and weatherability and can provide semi-permanent drawn lines.

Examples of the pigments to be used include inorganic pigments such as carbon black, titanium black, zinc oxide, red iron oxide, chromium oxide, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder.

Further, included are organic pigments such as C. I. PIGMENT YELLOW 34, C. I. PIGMENT RED 104, C. I. PIGMENT BLUE 27, C. I. PIGMENT BLUE 17, C. I. PIGMENT RED 81, C. I. PIGMENT VIOLET 1, C. I. PIGMENT BLUE 1, C. I. PIGMENT VIOLET 3, C. I. PIGMENT RED 53, C. I. PIGMENT RED 49, C. I. PIGMENT RED 57, C. I. PIGMENT RED 48, C. I. PIGMENT YELLOW 3, C. I. PIGMENT YELLOW 1, C. I. PIGMENT YELLOW 74, C. I. PIGMENT YELLOW 167, C. I. PIGMENT YELLOW 12, C. I. PIGMENT YELLOW 14, C. I. PIGMENT YELLOW 17, C. I. PIGMENT YELLOW 13, C. I. PIGMENT YELLOW 55, C. I. PIGMENT YELLOW 83, C. I. PIGMENT ORANGE 16, C. I. PIGMENT ORANGE 13, C. I. PIGMENT ORANGE 5, C. I. PIGMENT RED 38, C. I. PIGMENT RED 22, C. I. PIGMENT RED 5, C. I. PIGMENT RED 146, C. I. PIGMENT RED 245, C. I. PIGMENT VIOLET 50, C. I. PIGMENT BLUE 15, C. I. PIGMENT GREEN 7, C. I. PIGMENT YELLOW 95, C. I. PIGMENT YELLOW 166, C. I. PIGMENT VIOLET 19 and C. I. PIGMENT VIOLET 23. Further, included are a resin emulsion obtained by polymerizing styrene, acrylic acid, acrylic ester, methacrylic acid, methacrylic ester, acrylonitrile and an olefinic monomer, a hollow resin emulsion which is swollen in an ink to become indefinite form or various colored organic pigments comprising dyed resin particles obtained by dyeing these emulsions themselves with a colorant.

In the present invention, at least one pigment selected from these complementary color pigments can be used. The using amount of the complementary color pigment is preferably 0.5 to 10% by weight based on the total amount of the ink composition.

Further, the preceding resin emulsion and hollow resin emulsion which are white pigments for further strengthening a white color that is a ground color of titanium oxide particles have preferably an average particle diameter of 200 to 800 nm, and the using amount thereof is preferably 5 to 25% by weight based on the total amount of the ink composition.

The polar solvent used in the present invention can be used for the purpose of providing various qualities as a water based ink for a ballpoint pen, for example, preventing dry-up of the ink at a pen tip and freezing of the ink at a low temperature.

To be specific, the desired water content is 10% by weight or more, preferably 40% by weight or more on the whole ink composition.

The polar solvent includes water-soluble organic solvents having a moisture holding property such as ethylene glycol, diethylene glycol, propylene glycol, polyethylene glycol, polypropylene glycol, thiodiglycol, glycerin, diglycerin, 2-pyrrolidone, N-methyl-2-pyrrolidone, dimethylformamide and dimethylimidazolidinone. They are used preferably alone or in combination of plural kinds thereof.

Water used in the present invention is used as a solvent and includes purified water.

Further in the present invention, there can be added, if necessary, as other additives, for example, pH adjusting agents such as ammonia, urea, monoethanolamine, diethanolamine, triethanolamine, alkali metal salts of carbonic acid and phosphoric acid such as sodium tripolyphosphate and sodium carbonate, and hydroxides of alkali metals such as sodium hydroxide; preservatives or fungicides such as phenol, sodium omadine, sodium pentachlorophenol, 1,2-benzisothiazoline-3-one, 2,3,5,6-tetrachloro-4-(methylsulfonyl)pyridine, alkali metal salts of benzoic acid, sorbic acid and dehydroacetic acid such as sodium benzoate, and benzimidazole base compounds; rust preventives such as benzotriazole, dicyclohexylammonium nitrite, diisopropylammonium nitrite and tolyltriazole; lubricants and wetting agents such as derivatives of polyoxyethylene, polyoxypropylene or polyoxyethylenepolyoxypropylene such as polyoxyethylene lauryl ether, derivatives of glycerin, diglycerin or polyglycerin such as tetraglyceryl distearate, sorbitan derivatives such as sorbitan monooleate, surfactants having fluorinated alkyl groups such as perfluoroalkylphosphoric acid esters, polyether-modified silicone such as polyethylene glycol adducts of dimethylpolysiloxane, potassium linoleate, sodium ricinolate and potassium oleate. At least one of these additives can be added and used.

These surfactants given as examples of lubricants and wetting agents have also a function for stabilizing dispersion of pigment and titanium oxide particles. However, preferably used as dispersants are anionic surfactants such as alkylated sulfonic acid salts of higher fatty acid amides and alkylarylsulfonic acid salts, and water soluble polymers such as polyvinylpyrrolidone, polyvinyl alcohol, polyacrylic acid, acrylic acid copolymers, acrylic-methacrylic acid base resins, styrene-acryl base resins, maleic acid resins and styrene-maleic acid base resins.

Various methods which have so far been publicly known can be used for producing the water based white color tone pigment ink for a ballpoint pen according to the present invention. It can readily be obtained, for example, by blending the respective components described above, and then mixing and stirring them by means of a stirrer such as a dissolver or crushing and mixing them by means of a ball mill or three rolls, followed by removing coarse particles of the pigment particles and the titanium oxide particles, undissolved substances and contaminated solid substances by centrifugation and filtration.

EXAMPLES

Next, the present invention shall be explained in further details with reference to examples and comparative examples, but the present invention shall not be restricted by these examples.

Example 1

Titanium oxide (Tipaque R-820 manufactured by Ishiwara Sangyo Kaisha, Ltd.) having the physical properties of an oil absorption of 24 and a particle diameter of 260 nm was used, and the following components were stirred and then filtered to prepare a water based ink for a ballpoint pen.

| | |
|---|---|
| Titanium oxide (Tipaque R-820) | 30.0 parts by weight |
| Water soluble resin (styrene-acryl resin J-780 manufactured by Johnson Polymer Co., Ltd.) | 2.0 parts by weight |
| Propylene glycol | 10.0 parts by weight |
| Xanthan gum | 0.5 part by weight |
| Potassium oleate | 0.5 part by weight |
| Purified water | 57.0 parts by weight |

Example 2

Titanium oxide (Tipaque A-100 manufactured by Ishiwara Sangyo Kaisha, Ltd.) having the physical properties of an oil absorption of 22 and a particle diameter of 150 nm was used, and the following components were stirred and then filtered to prepare a water based ink for a ballpoint pen.

| | |
|---|---|
| Titanium oxide (Tipaque A-100) | 30.0 parts by weight |
| Water soluble resin (styrene-acryl resin J-780 manufactured by Johnson Polymer Co., Ltd.) | 2.0 parts by weight |
| Propylene glycol | 10.0 parts by weight |
| Xanthan gum | 0.5 part by weight |
| Potassium oleate | 0.5 part by weight |
| Purified water | 57.0 parts by weight |

Example 3

Titanium oxide (Tipaque A-100 manufactured by Ishiwara Sangyo Kaisha, Ltd.) having the physical properties of an oil absorption of 22 and a particle diameter of 150 nm was used, and a hollow resin emulsion (average particle diameter: 400 nm) which was an organic white pigment was used as a complementary colorant. The following components were stirred and then filtered to prepare a water based ink for a ballpoint pen.

| | |
|---|---|
| Titanium oxide (Tipaque A-100) | 30.0 parts by weight |
| Water soluble resin (styrene-acryl resin J-780 manufactured by Johnson Polymer Co., Ltd.) | 2.0 parts by weight |
| Hollow resin emulsion (Ropaque OP-62: resin solid content 37.5%)) | 40.0 parts by weight |
| Propylene glycol | 10.0 parts by weight |
| Xanthan gum | 0.5 part by weight |
| Potassium oleate | 0.5 part by weight |
| Purified water | 17.0 parts by weight |

Example 4

Titanium oxide (Tipaque R-820 manufactured by Ishiwara Sangyo Kaisha, Ltd.) having the physical properties of an oil absorption of 24 and a particle diameter of 260 nm was used, and a complementary color pigment was used. The following components were stirred and then filtered to prepare a water based ink for a ballpoint pen.

| | |
|---|---|
| Titanium oxide (Tipaque R-820) | 30.0 parts by weight |
| Water soluble resin (styrene-acryl resin J-780 manufactured by Johnson Polymer Co., Ltd.) | 2.0 parts by weight |
| Propylene glycol | 10.0 parts by weight |
| Xanthan gum | 0.5 part by weight |
| Potassium oleate | 0.5 part by weight |
| Lacqutimine Color Green FLB Conc (manufactured by Dainichiseika Color & Chemicals MFG Co., Ltd.) | 15.0 parts by weight |
| Purified water | 42.0 parts by weight |

Example 5

Titanium oxide (Tipaque R-820 manufactured by Ishiwara Sangyo Kaisha, Ltd.) having the physical properties of an oil absorption of 24 and a particle diameter of 260 nm was used, and a hollow resin emulsion (average particle diameter: 400 nm) which was an organic white pigment was used as a complementary color pigment. The following components were stirred and then filtered to prepare a water based ink for a ballpoint pen.

| | |
|---|---|
| Titanium oxide (Tipaque R-820) | 20.0 parts by weight |
| Water soluble resin (styrene-acryl resin J-61J manufactured by Johnson Polymer Co., Ltd.) | 2.0 parts by weight |
| Hollow resin emulsion (Ropaque OP-62: resin solid content 37.5%) | 30.0 parts by weight |
| Propylene glycol | 10.0 parts by weight |
| Locust bean gum | 0.5 part by weight |
| Potassium oleate | 0.5 part by weight |
| Lacqutimine Color Green FLB Conc (manufactured by Dainichiseika Color & Chemicals MFG Co., Ltd.) | 15.0 parts by weight |
| Purified water | 22.0 parts by weight |

Comparative Example 1

Titanium oxide (Tipaque R-780-2 manufactured by Ishiwara Sangyo Kaisha, Ltd.) having the physical properties of an oil absorption of 40 and a particle diameter of 240 nm was used, and the following components were stirred and then filtered to prepare a water based ink for a ballpoint pen.

| | |
|---|---|
| Titanium oxide (Tipaque R-780-2) | 30.0 parts by weight |
| Water soluble resin (styrene-acryl resin J-780 manufactured by Johnson Polymer Co., Ltd.) | 2.0 parts by weight |
| Propylene glycol | 10.0 parts by weight |
| Xanthan gum | 0.5 part by weight |
| Potassium oleate | 0.5 part by weight |
| Purified water | 57.0 parts by weight |

Comparative Example 2

Titanium oxide (KA-10 manufactured by Titan Ind. Co., Ltd.) having the physical properties of an oil absorption of 23 and a particle diameter of 500 nm was used, and the following components were stirred and then filtered to prepare a water based ink for a ballpoint pen.

| | |
|---|---|
| Titanium oxide (KA-10) | 30.0 parts by weight |
| Water soluble resin (styrene-acryl resin J-780 manufactured by Johnson Polymer Co., Ltd.) | 2.0 parts by weight |
| Propylene glycol | 10.0 parts by weight |
| Xanthan gum | 0.5 part by weight |
| Potassium oleate | 0.5 part by weight |
| Purified water | 57.0 parts by weight |

Comparative Example 3

Titanium oxide (KA-80 manufactured by Titan Ind. Co., Ltd.) having the physical properties of an oil absorption of 26 and a particle diameter of 500 nm was used, and the following components were stirred and then filtered to prepare a water based ink for a ballpoint pen.

| | |
|---|---|
| Titanium oxide (KA-80) | 30.0 parts by weight |
| Water soluble resin (styrene-acryl resin J-780 manufactured by Johnson Polymer Co., Ltd.) | 2.0 parts by weight |
| Propylene glycol | 10.0 parts by weight |
| Xanthan gum | 0.5 part by weight |
| Potassium oleate | 0.5 part by weight |
| Purified water | 57.0 parts by weight |

Comparative Example 4

Titanium oxide (Tipaque R-820 manufactured by Ishiwara Sangyo Kaisha, Ltd.) having the physical properties of an oil absorption of 24 and a particle diameter of 260 nm was used, and the following components in which the water soluble resin was not contained were stirred and then filtered to prepare a water based ink for a ballpoint pen.

| | |
|---|---|
| Titanium oxide (Tipaque R-820) | 30.0 parts by weight |
| Propylene glycol | 10.0 parts by weight |
| Xanthan gum | 0.5 part by weight |
| Potassium oleate | 0.5 part by weight |
| Purified water | 59.0 parts by weight |

Comparative Example 5

Titanium oxide (Tipaque R-820 manufactured by Ishiwara Sangyo Kaisha, Ltd.) having the physical properties of an oil absorption of 24 and a particle diameter of 260 nm was used, and the following components in which the water soluble resin emulsion was not contained and the complementary color pigment was contained were stirred and then filtered to prepare a water based ink for a ballpoint pen.

| | |
|---|---|
| Titanium oxide (Tipaque R-820) | 30.0 parts by weight |
| Propylene glycol | 10.0 parts by weight |
| Locust bean gum | 0.5 part by weight |
| Potassium oleate | 0.5 part by weight |
| Lacqutimine Color Green FLB Conc (manufactured by Dainichiseika Color & Chemicals MFG Co., Ltd.) | 15.0 parts by weight |
| Purified water | 44.0 parts by weight |

The inks obtained in Examples 1 to 5 and Comparative Examples 1 to 5 described above were subjected to tests of an average particle diameter of titanium oxide, a viscosity of the inks, a color developing property of the inks and a follow-up property of the inks by the following test methods. The results thereof are shown in the following Table 1 and Table 2.

Average Particle Diameter of Titanium Oxide (1) The average particle diameter was determined by means of NICOMP 370 (manufactured by Nozaki & Co., Ltd.) using a photon correlation method within a week after preparing the inks.

(2) The average particle diameter was determined by the same method as measuring the initial particle diameter [(1) described above] after left standing at room temperature for 6 months after preparing the inks.

Viscosity of the Inks (1) The viscosity at 1 rpm was determined by means of an EMD type viscometer (manufactured by Toki Sangyo Co., Ltd.) within a week after preparing the inks.

(2) The viscosity was determined by the same method as measuring the initial viscosity [(1) described above] after left standing at room temperature for 6 months after preparing the inks.

Color Developing Property of the Inks

The ink was filled into a refill comprising a polypropylene-made ink reservoir having an inner diameter of 3.5 mm and a length of 100 mm and having no feed and a stainless steel-made pen tip having a ball of a diameter of 0.7 mm to prepare a ballpoint pen A for evaluation.

This ballpoint pen A for evaluation was used to write on a Xerox M paper (absorbent paper), a black coat paper (non-absorbent paper) and a black drawing paper (absorbent paper: New Color No. 418 manufactured by Shikoku Paper Co., Ltd.) respectively to evaluate the color developing property of the drawn lines thereof with eyes based on the following evaluation standards:

○: sharp color developing property is obtained

●: color developing property is good, but covering property is slightly inferior Δ: coloring is reduced, and the ground color of the writing paper can be observed ▲: color developing property is inferior, and the ground color of the writing paper can be observed ×: drawn lines can scarcely be observed Follow-up Property of the Inks The preceding ballpoint pen A for evaluation was used for quick writing of spirals with a hand, and the presence of starving and splitting in the resulting lines was observed with eyes based on the following evaluation standards:

Evaluation Standards

⊚: not present at all

○: slightly present

Δ: a little present

×: present very much

TABLE 1

|  | Average particle diameter (nm) | | Viscosity (mPa · s) | |
| --- | --- | --- | --- | --- |
|  | Initial | After 6 months | Initial | After 6 months |
| Example-1 | 280 | 307 | 1066 | 1180 |
| Example-2 | 166 | 177 | 1853 | 2050 |
| Example-3 | 482 | 501 | 2410 | 2220 |
| Example-4 | 325 | 358 | 1520 | 1780 |
| Example-5 | 475 | 496 | 2360 | 2670 |
| Comparative Example-1 | 660 | 841 | 4730 | 6880 |
| Comparative Example-2 | 683 | 815 | 1190 | 2750 |
| Comparative Example-3 | 910 | 1220 | 2460 | 3820 |
| Comparative Example-4 | 572 | 1053 | 2100 | 4026 |
| Coinparative Example-5 | 744 | 1401 | 2830 | 6580 |

It is apparent from the results shown in Table 1 described above that the inks obtained in Examples 1 to 5 which fall in the scope of the present invention have less variation degrees in coagulation of the titanium oxide particles and the thickening property with the lapse of time and are stable as compared with the inks obtained in Comparative Examples 1 to 5 which fall outside the scope of the present invention.

TABLE 2

| | Ink color-developing property | | | Ink follow-up property | |
| --- | --- | --- | --- | --- | --- |
| | Xerox M paper | Black drawing paper | Coat paper | Starving | Splitting |
| Example-1 | ○ | ● | ○ | ⊚ | ⊚ |
| Example-2 | ○ | ● | ○ | ⊚ | ⊚ |
| Example-3 | ○ | ○ | ○ | ⊚ | ○ |
| Example-4 | ○ | ● | ○ | ⊚ | ⊚ |
| Example-5 | ○ | ○ | ○ | ⊚ | ○ |
| Comparative Example-1 | ○ | ● | ○ | × | Δ |
| Comparative Example-2 | ● | ● | ○ | Δ | Δ |
| Comparative Example-3 | ● | ● | ○ | Δ | Δ |
| Comparative Example-4 | ● | ● | ○ | Δ | Δ |
| Comparative Example-5 | ● | ● | ○ | × | × |

As apparent from the results shown in Table 2 described above, it can be judged that the inks obtained in Examples 1 to 5 which fall in the scope of the present invention are excellent in an ink color-developing property and an ink follow-up property as compared with the inks obtained in Comparative Examples 1 to 5 which fall outside the scope of the present invention.

INDUSTRIAL APPLICABILITY

According to the present invention, provided is a water based white color tone pigment ink for a ballpoint pen which is provided with dispersion stability without causing coagulation of titanium oxide particles and pigment particles and which covers the ground color of writing paper so that it can provide drawn lines that have a poster color and are excellent in developing colors on any writing paper.

What is claimed is:

1. A water based white color tone pigment ink for a ballpoint pen consisting essentially of from about 15 to 30% by weight of titanium oxide having an oil absorption of 25 (g/100 g) or less and an average particle diameter of 400 nm or less, from about 0.1 to about 20% by weight of a water soluble resin based on the amount of titanium oxide present, a thickener, water and a polar solvent, wherein the ink has a viscosity of 500 to 5000 mPa·s.

2. The water based white color tone pigment ink for a ballpoint pen as described in claim 1, comprising at least one complementary colorant selected from the group consisting of a pigment, a resin emulsion, a hollow resin emulsion and a pseudo pigment obtained by dyeing said resin emulsions.

3. The water based white color tone pigment ink for a ballpoint pen as described in claim 2, wherein the water soluble resin comprises a polymer and/or a copolymer of at least one monomer selected from the group consisting of acrylic acid, methacrylic acid, maleic acid, styrene, acrylic ester and methacrylic ester.

4. The water based white color tone pigment ink for a ballpoint pen as described in claim 1, wherein the water soluble resin comprises a polymer and/or a copolymer of at least one monomer selected from the group consisting of acrylic acid, methacrylic acid, maleic acid, styrene, acrylic ester and methacrylic ester.

* * * * *

UNITED STATES PATENT AND TRADEMARK OFFICE
CERTIFICATE OF CORRECTION

PATENT NO.    : 6,492,435 B1
DATED         : December 10, 2002
INVENTOR(S)   : Masaru Miyamoto et al.

It is certified that error appears in the above-identified patent and that said Letters Patent is hereby corrected as shown below:

<u>Title page,</u>
Item [22], PCT Filed:, delete "May 6, 1999" and substitute -- May 6, 1998 --

Signed and Sealed this

Seventeenth Day of June, 2003

JAMES E. ROGAN
*Director of the United States Patent and Trademark Office*